United States Patent [19]
Tuckwell

[11] 3,963,898
[45] June 15, 1976

[54] ELECTRIC COOKING APPLIANCE

[75] Inventor: Clayton K. Tuckwell, Eau Claire, Wis.

[73] Assignee: National Presto Industries, Inc., Eau Claire, Wis.

[22] Filed: July 7, 1975

[21] Appl. No.: 593,573

[52] U.S. Cl. .................................. 219/524; 99/375; 99/378; 99/445; 99/446; 219/386; 219/535; 425/408
[51] Int. Cl.$^2$ ..................... H05B 1/00; A47J 37/00; B29C 3/00
[58] Field of Search ...................... 99/340, 372–385, 99/422–426, 428, 439, 445–449, 432, 440–442; 219/524, 525, 520, 521, 385, 386, 387, 436, 438, 443, 535, 472, 474, 475; 100/93 R, 93 P; 425/408

[56] References Cited
UNITED STATES PATENTS

| | | | |
|---|---|---|---|
| 79,056 | 6/1868 | Denn | 99/445 |
| 111,516 | 2/1871 | Colborne et al. | 99/445 X |
| 119,892 | 10/1871 | Smith | 99/401 |
| 1,077,866 | 11/1913 | Ball | 219/524 X |
| 1,246,622 | 11/1917 | Lightfoot | 99/422 X |
| 1,734,138 | 11/1929 | Lehmann | 99/441 |
| 2,031,259 | 2/1936 | Fox | 219/525 UX |
| 2,423,963 | 7/1947 | Coffman | 99/372 X |
| 3,007,595 | 11/1961 | Remley | 99/381 UX |
| 3,108,531 | 10/1963 | Jepson et al. | 219/524 X |
| 3,831,001 | 8/1974 | Toomey et al. | 219/524 X |

FOREIGN PATENTS OR APPLICATIONS

| | | | |
|---|---|---|---|
| 666,637 | 10/1938 | Germany | 219/524 |
| 321,443 | 6/1957 | Switzerland | 219/438 |

*Primary Examiner*—A. Bartis
*Attorney, Agent, or Firm*—Johnson, Dienner, Emrich & Wagner

[57] ABSTRACT

An electric cooking appliance has a base which removably supports a lower cooking element in its open top. The appliance has a cover which is removably hinged to the base. This cover contains an upper cooking element provided with a depending rib which contains a heating element and interfits with a provided channel in the lower cooking element when the cover is closed against the base. The lower cooking element has a handle and is provided with apertures through which fluids from the cooking food can drain into the base. The base and cover also have recessed handles which engage about the handle of the lower cooking element and a bail is provided which releaseably locks the handles together to assure an effective transfer of heat through the conductive metal of the rib to the two cooking elements such that a hamburger or other food positioned between the two cooking elements can be simultaneously heated from both sides by the one heating element with the cover closed against the base.

13 Claims, 15 Drawing Figures

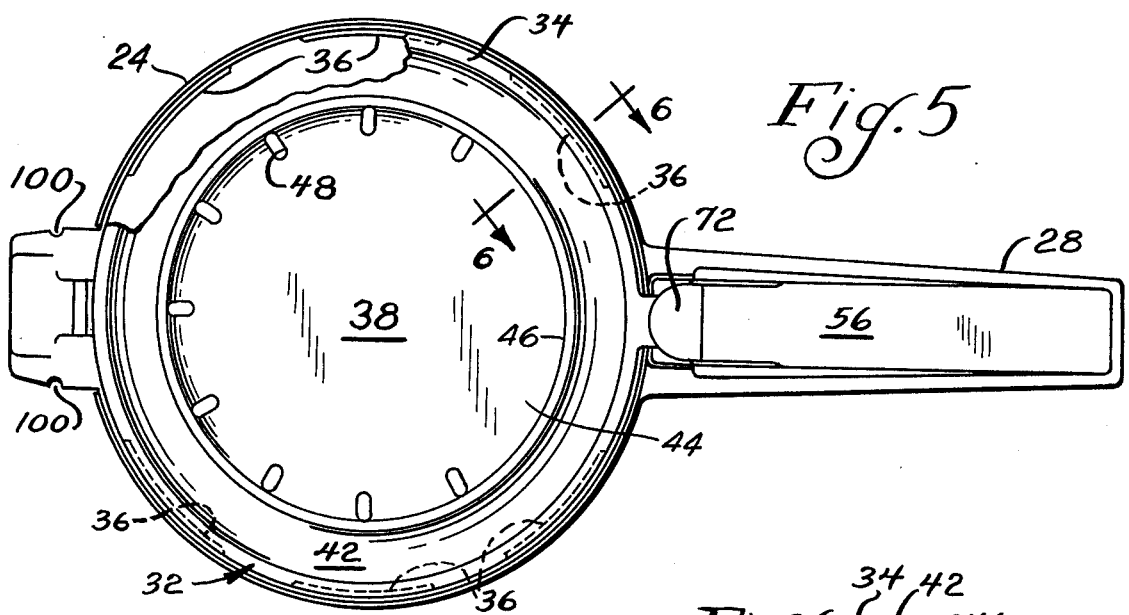
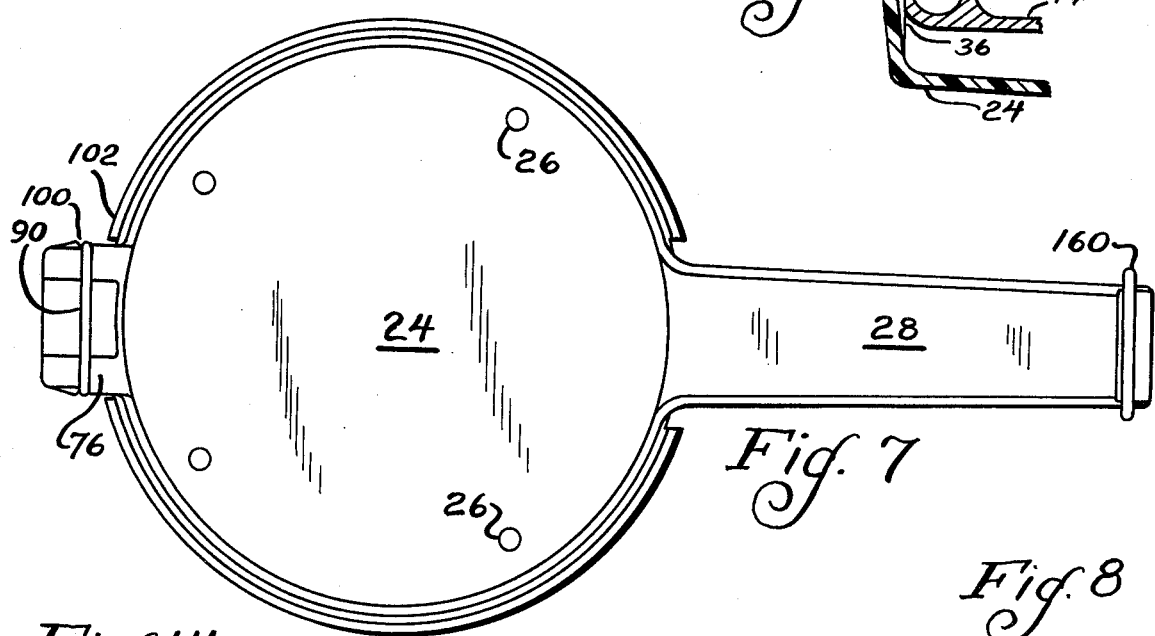
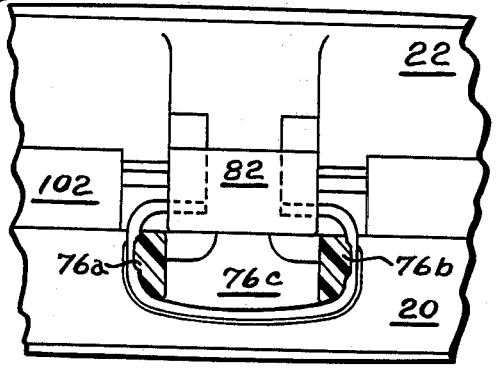
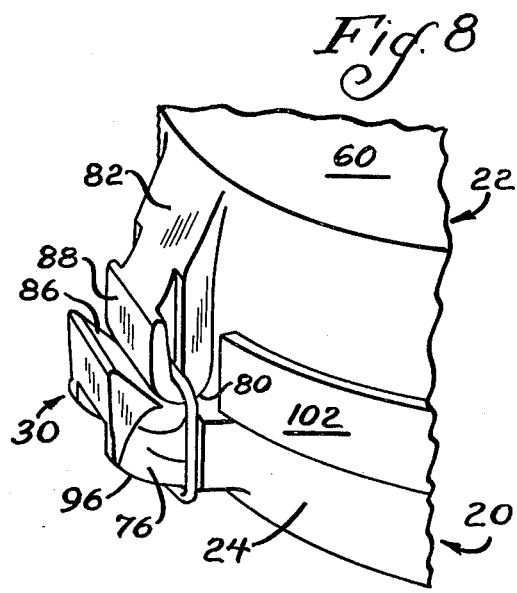

3,963,898

ELECTRIC COOKING APPLIANCE

This invention relates to a novel construction of cooking appliances which are useful for simultaneously cooking both sides of food such as a hamburger, muffin, sandwich or the like.

Appliances for this purpose are well known in the art. Conventionally, such appliances have comprised a base unit to which was affixed a heat conductive metal casting presenting an upper grill surface. Hinged to the base unit would be a cover which also contained a heat conductive metal casting affixed to it and presenting a lower grill surface which aligns with the first grill surface on closing of the cover. The two castings would each have an associated heating element either cast-in or fixed to the respective castings and the facing grill surfaces of the two castings would be suitably contoured to provide a food cooking cavity therebetween when the cover was closed against the base unit. Exemplary thereof are the disclosures of a pie and pie shell maker in U.S. Pat. No. 1,874,836, of a combined roll and frankfurt electric toasting device in U.S. Pat. No. 2,044,615, of a sandwich grid in U.S. Pat. No. 2,632,380, of an hors d'oeuvre maker in U.S. Pat. No. 3,108,531 and of a cooking appliance in U.S. Pat. No. 3,719,507. In the disclosures of U.S. Pat. Nos. 1,874,836 and 3,719,507, there is also disclosed a channel about the lower grill surface which collects the juices from the cooking food, the juices draining therefrom externally of the appliance.

In accordance with this invention, a single heating element is relied upon to cook the food and it is cast in or staked to the upper cooking element which is affixed to the cover of the electric appliance. The lower cooking element is removably seated in the base so that it is separable therefrom also; and it is provided with apertures in its bottom wall through which the fluids or juices from the cooking food can drain into the base beneath where they are collected. The single heating element is preferably located within a depending rib of the upper cooking element and the contour of the rib is shaped to interfit with a channel provided in a peripherally disposed raised rib of the lower removable cooking element when the cover is closed against the base. The appliance also has means in the form of bails which releaseably lock the cover to the base at opposite ends of the assembly and securely hold the depending rib of the upper cooking element within the provided channel and against the surface thereof such that the single heating element conductively heats both cooking elements in an efficient, effective manner.

An important feature of the invention is that all of the required electrical components for operating the heating element including the thermostatic switch, the electrical connectors and terminal posts are located in the separable cover.

A further feature of the invention is that both the lower cooking element and the base in which the cooking juices and fluid collect are separable from each other and from the cover for convenience in cleaning. Both the base and its cooking element are also completely immersible in water for this purpose.

Another important feature of the invention is the arrangement employed by which the cover may be releaseably locked to the base and so as to insure that the upper cooking element has an effective heat transfer contact with the heat conductive metal of the lower cooking element while at the same time facilitating ready separation of the base and cover.

A further feature of the invention is that the lower cooking element has a heat insulated handle by which it is conveniently manipulated and the handles of both the base and cover are recessed on their facing sides to confine and locate the lower cooking element by engaging about portions of its handle.

Another feature of the invention is the novel hinge mechanism employed which allows pivoting of the cover from the base without separation therefrom, but at the same time permits the cover to be instantly separated when it is necessary to clean the base.

Still another feature of the invention is that the appliance is preliminarily useful as a press so that a scoop or ball of food such as a measured quantity of hamburger placed in the lower cooking element, on closing of the cover, can be pressed or molded between the cooking elements to a patty shape which is completed as the hamburger cooks.

Many other objects, advantages and/or features of the invention will be at once apparent or will become so upon consideration of the preferred embodiment of the invention which now will be described.

Referring therefore now to the drawings:

FIG. 5 is a top plan view of the appliance with the cover removed and portions cut away to show details of the lower cooking element, the relationship of its attached handle and the ledges on which it is supported within the base;

FIG. 6 is a sectional view taken along lines 6—6 of FIG. 5 looking in the direction indicated by the arrows;

FIG. 7 is a bottom plan view of the appliance;

FIG. 8 is a fragmented end view in perspective showing details of the releaseable hinged connection of the cover to the base of the appliance;

FIG. 14 is a fragmented end view and illustrates an alternate hinge construction.

Figure 1:
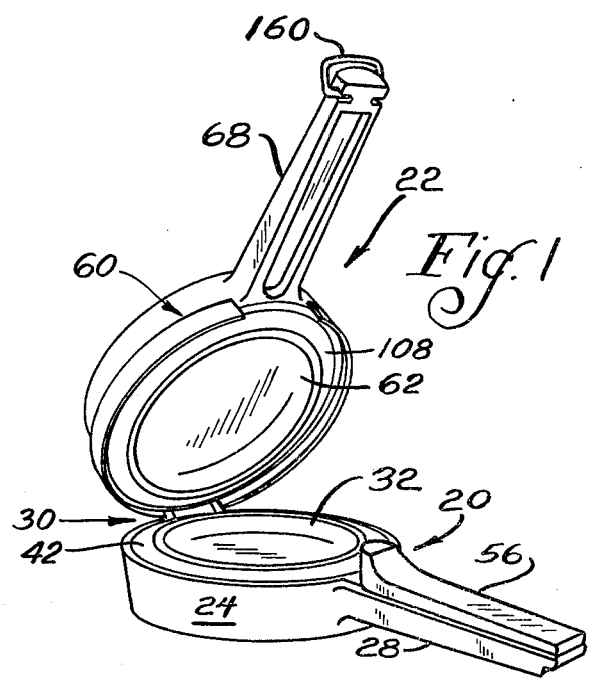
FIG. 1 is a perspective view of a preferred embodiment of the invention, the cover being shown pivoted to its open position for insertion or removal of food such as a hamburger.

Referring now more specifically to the several views wherein like parts are identified by like reference numerals and first to FIG. 1, the invention is shown embodied in an electrical appliance which is particularly useful for pressing a ball or scoop of hamburger into a patty shape and cooking it simultaneously on both sides. Such an appliance is shown as comprising a base housing unit 20 and an upper housing unit 22 hingedly connected to the base housing unit at one end (30), both the base housing unit and upper housing unit being molded of heat insulating material such as phenolic resin. Considering also FIG. 2 with FIG. 1, the base housing unit 20 comprises an open top receptacle portion 24 having integral feet 26 on its underside and an integral elongate handle portion 28 which projects outwardly from one side of the receptacle portion 24 opposite that to which the upper housing unit 22 is hinged. Removably seated within the open top of receptacle portion 24 of the base housing unit 20 is a lower cooking element 32 or pan of heat conductive material such as cast aluminum, the lower cooking element having a peripheral flange portion 34 which rests on space ledges 36 (FIGS. 5 and 6) so as to create a space therebeneath to collect and contain those food juices from the cooking food which drain through provided apertures in the lower cooking element 32. In the illustrated embodiment, lower cooking element 32 has a circular shaped concave cooking area 38 defined by a surrounding upstanding continuous rib 40 in its outer marginal portion which is channeled or grooved on its upper side at 42. Cooking area 38 has essentially flat cooking surface 44 and essentially vertically disposed side wall 46 defined by the surrounding rib portion 40, the shape and dimensions of which correspond to the hamburger pattie or other food to be cooked by the appliance. Peripherally disposed about the cooking surface 44 immediately adjacent its surrounding wall 46 are spaced aperatures 48 through which fluids from the cooking food drain into the receptacle portion 24 of the base or lower housing unit 20. In the illustrated embodiment of the invention the cooking area defined by side wall 46 is circular. However, it may be of any other required shape, for example, rectangular with, or without, rounded corners. At 50, the lower cooking element 32 is provided with a mounting flange which extends through a suitably notched portion 52 of the receptacle portion 24 and to which a handle 56 of heat insulated plastic material is permanently attached as by screw 54.

The upper housing unit 22 of heat insulating material includes a cover portion 60 correspondingly shaped to mate with the receptacle portion 24 of the lower housing unit. The open underside of cover 60 is closed by an upper cooking unit 62 permanently affixed thereto as by screws 64 providing a closed space in which the electrical components of the appliance are housed as hereinafter more particularly described. Integral with cover portion 60 is an integral handle 68 which aligns with the handle 28 of the base housing unit, the aligned handles of the base housing unit and upper housing unit being recessed on their facing sides to receive depending projection 70 and upstanding projection 72 of the lower cooking element handle 56 when the lower cooking element is properly located between the upper and lower housing units and so as to prevent rotation of the lower cooking element and/or lateral displacement of the housing units when not locked in place as hereinafter more particularly described.

Considering now FIG. 8 and 9 with FIG. 2, the means 30 by which the two housing units 20, 22 are releaseably hinged together will be described. For this purpose, on the side of the receptacle portion 24 of the lower housing unit opposite its handle portion 28, is an integral projection 76 having a recess 78 of cylindrical concave shape on its upper side. Rotatably and slidably received within said recess 78 is the convexed underside 80 of a similarly located projection 82 of the upper housing unit. Said convexed underside portion 80 has a cylindrical shape, the axis of which is indicated at 84 in FIGS. 2 and 9 corresponds with the axis of the cylindrical shaped recessed portion 78 of the projection 76 of the lower housing unit. The upper housing unit is therefore free to swing on said axis 84 between the closed position illustrated by FIG. 2 and the open position illustrated by FIG. 1, the limits of said swing being determined by portions 86 and 88 of the respective projections 76, 82. Considering also FIG. 10 with FIGS. 2, 8 and 9, bail 90 serves to releaseably lock projection 76 to projection 82 without interfering with the aforedescribed hinging movement. Bail 90 is of shape retaining but resilient material and is illustrated by FIGS. 8 and 10 has its two end portions 92 received with recesses 94 which coincide with axis 84. The arcuate underside 96 of the lower projection 76 is preferably also centered on axis 84 which allows bight 98 of the bail 90 freedom to move beneath the lower projection until its two sides 102 resiliently catch in vertically extending recesses 100 (FIGS. 5 and 7) on either side of said lower projection 76 and resiliently releaseably secure the two projections 76, 82 forming hinge 30.

Figure 15:
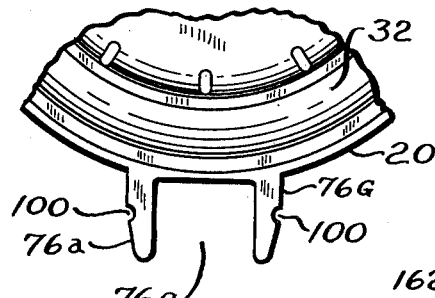
FIG. 15 is a fragmented plan view of the hinged end of the base employing said alternate hinge construction.

In the alternate construction as illustrated by FIGS. 14 and 15 projection 76 of the lower housing unit is replaced by a pair of spaced projections 76a and 76b, the space 76c therebetween providing clearance for projection 82 which permits the upper housing unit 22 to swing on bail ends 92 a full 180° so that the cover may be rested on a counter still attached to the lower housing unit 20.

Figure 2:
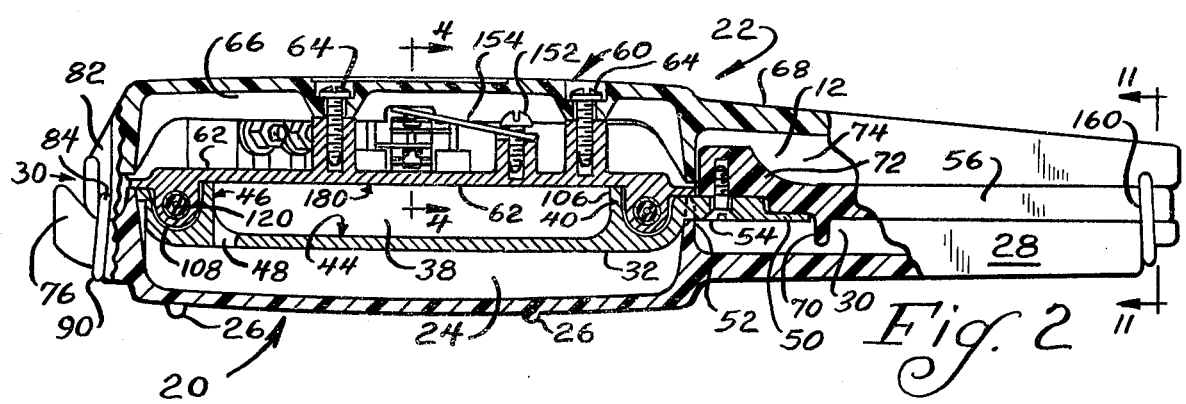
FIG. 2 is a sectional view taken lengthwise through the appliance, the cover being shown in its closed position and locked to the base.
Figure 9:
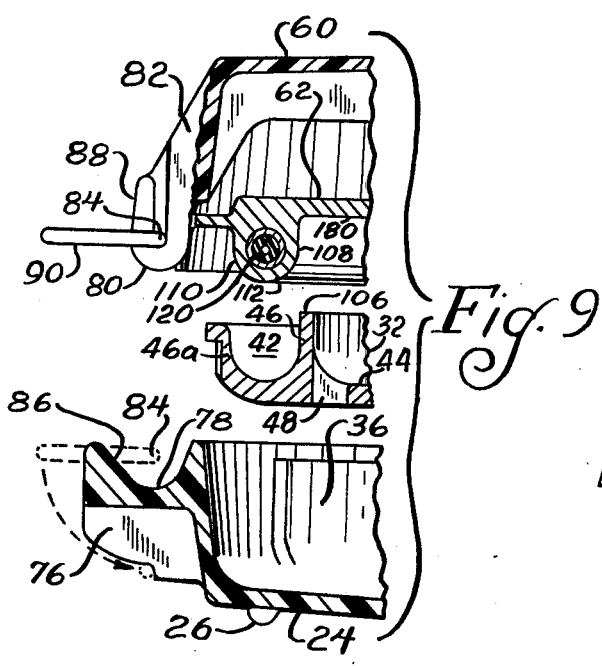
FIG. 9 is a partially fragmented sectional view of the end of the appliance illustrated by FIG. 6 and shows the elements in a separated or exploded relation.
Figure 10:
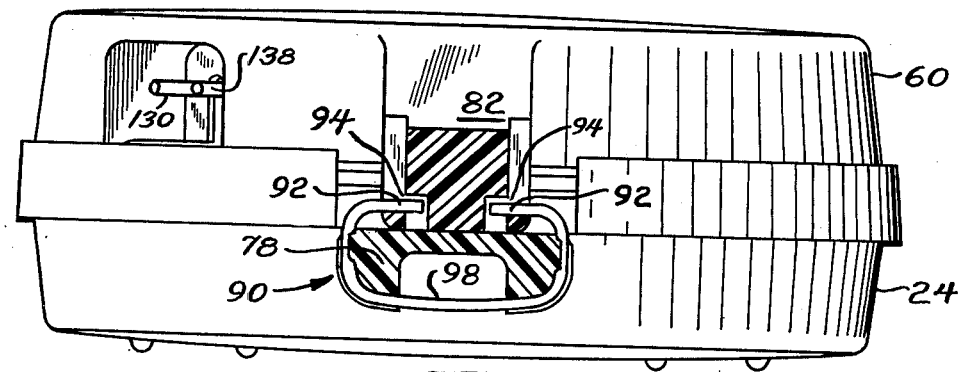
FIG. 10 is another view of said end of the appliance which is partially sectioned to show further details of the releaseable hinge connection.

Considering now FIG. 9 with FIG. 2, in the closed position of the housing units 20, 22 the upper cooking element 62 is concentrically aligned with the lower cooking unit 32 and engages the upper inner edge 106 of the raised rib 40 about the cooking area 38 of the lower cooking element. As illustrated in FIG. 9, the outer marginal portion of said upper cooking element 62 has a peripherally located depending continuous rib 108 about its central cooking area 180, said rib 108 having vertical sidewalls 110 and a rounded base 112 which intimately fits and engages the corresponding shaped sidewalls and base of the channel 42 in the raised rib 40 of the lower cooking element 32, thus establishing an effective heat transfer relation by conduction between the two cooking elements when the two housing units 20, 22 are locked in their closed position (FIG. 2) as hereinafter described.

Figure 12:
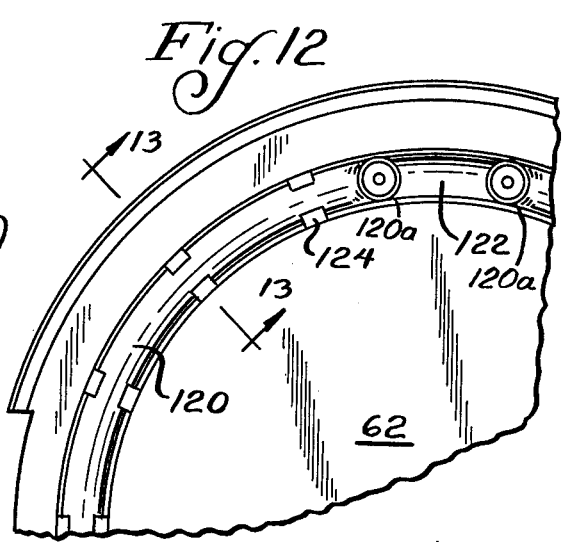
FIG. 12 illustrates an alternate assembly of the heating element in heat transfer relation with the upper cooking element.
Figure 13:
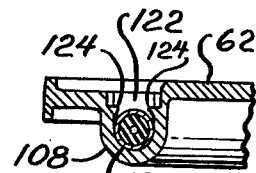
FIG. 13 is a sectional view taken along lines 13—13 of FIG. 12 looking in the direction indicated by the arrows and shows further details of said alternate construction.

In the preferred embodiment of the invention the rib 108 contains a sheathed heating element 120 which is buried within the rib during the casting of the upper cooking element 62. This construction is illustrated by FIG. 2. In an alternate construction illustrated by FIGS. 12 and 13, depending rib 108 has a channel or groove 122 into which the heating element 120 is inserted from the upper side of the casting comprising upper cooking element 62. In this alternate arrangement, portions 124 of the casting are inwardly struck to stake and firmly hold the heating element 120 within the receiving channel 122 with its lower surface in intimate contact with the bottom of the groove 122.

Figure 4:
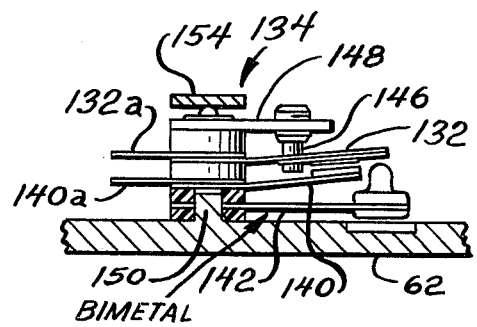
FIG. 4 is a fragmented sectional view taken along lines 4—4 of FIG. 2 looking in the direction indicated by the arrows.
Figure 3:
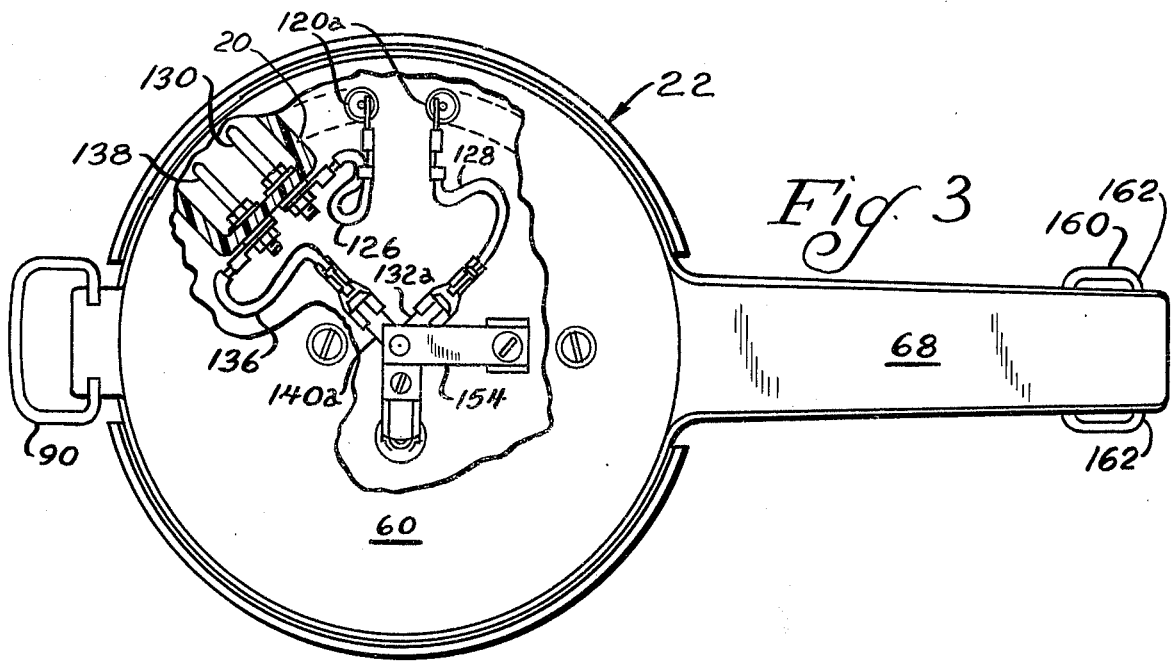
FIG. 3 is a top plan view of the appliance, a portion of the cover being cut away to reveal the electrical components which are stored within the cover.

In either construction, the two ends 120a of the sheathed heating element 120 are turned upwardly and connected to suitable electric conductors 126 and 128 (FIG. 3). Conductor 126 is shown electrically connected to a first externally accessible terminal post 130 and electrical conductor 128 through terminal 132a to a first switch element 132 of a conventional thermostat 134. A third conductor 136 connects the second externally accessible terminal post 138 through terminal 140a to a second switch element 140 of thermostat 134. As illustrated in FIG. 4, switch element 132 and its terminal 132a are in electrically insulated relation from the second switch element 140 and its terminal 140a; and they make and break contact in response to movement of a bimetallic element 142 which responds to temperature changes in the upper cooking element 62 so as to maintain a predetermined cooking temperature. Adjustment of said cooking temperatures is preset by inward or outward adjustment of element 146 on its threaded connection to mount 148. As illustrated in FIG. 4, the thermostat assembly 134 is centered on integral stud 150 on the upper side of the upper heating element 62 and secured in place by an insulated leaf spring 154 which is tightened against the top of the insulated stack as by screw 152 (FIG. 2). Any other suitable thermostatic control switch and means of mounting same may also be utilized in accordance with the invention.

Figure 11:
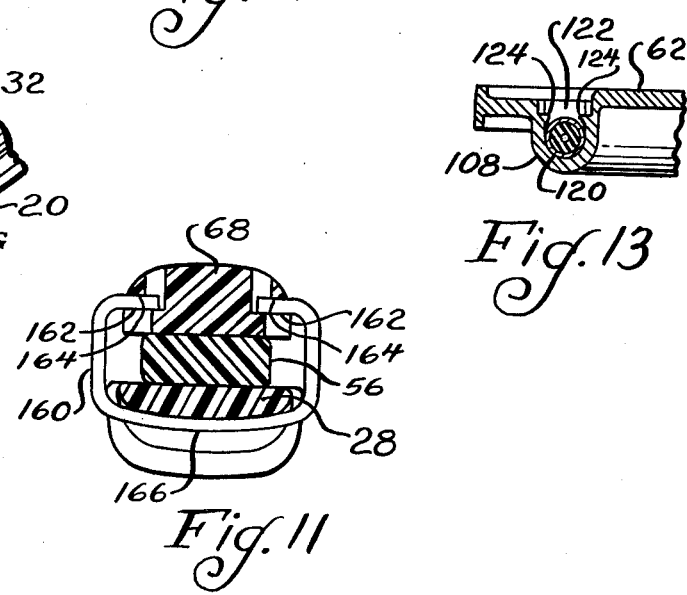
FIG. 11 is a sectional view taken along lines 9—9 of FIG. 2 looking in the direction indicated by the arrows and shows details of the locking means by which the handles are maintained in a releaseably secured relation.

Locking means in the form of a bail 160 has its ends 162 (FIGS. 2 and 11) pivotally caught in aligned recesses 164 such that its bight 166 is free to swing beneath the end of handle 28 of the base unit so as to resiliently, frictionally catch therebeneath to hold handles 28, 68 snugly against handle 56 of the lower cooking element 32 and thereby releaseably hold rib 108 in firm intimate snug contact with the bottom of channel 42 of the lower cooking element 32 during use of the appliance.

In preparation for cooking hamburgers one end of a conventional cord set (not shown) is connected to terminal posts 130, 138 and its opposite end to an electrical outlet. Usually the appliance is preheated prior to the hamburger actually being placed on the cooking surface 44 of its pan-like lower cooking element 32. In order to maintain the necessary heat conductivity between the two cooking surfaces 44 and 180 during preheat and cooking, both bails 90 and 160 must be in place so that the upper and lower housings are locked together. After preheating, with bail 90 left in place and bail 160 released, the upper housing unit 22 may be grasped by its handle 68 and swung to an open position (FIG. 1) about axis 84. A quantity of ground meat in either preformed or meat-ball shape then may be placed on surface 44 of the lower cooking element 32 and the upper unit 22 lowered about its hinged connection 30 to a closed position (FIG. 2). Bail 160 is then recaught beneath the recessed end of handle 28. As rib 108 enters channel 42 with closing of the upper unit, the ground meat is pressed and molded between sufaces 44 and 180 to the shape of the cooking cavity or area 38, the ultimate form being made as the hamburger cooks. Although the cooking volume is not sealed, it has been found that confinement of the cooking hamburger between the two cooking elements 32, 62 does restrict the exhaust of steam created by the cooking process and substantially increases the cooking speed.

After the hamburger has been cooked, bail 160 may be released, the upper housing unit 22 rotated to its open position and the cooking pan or lower cooking element 32 removed by grasping its handle 56. Preferably the two central cooking areas of the two cooking elements 32, 62 represented by surfaces 44, 180 and the surrounding inner surface of sidewall 46 are provided with a non-stick coating of Teflon. The cycle can be repeated immediately with no delay.

As the hamburger cooks, collecting grease and other fluids drip through the apertures 48 to the receptacle 24 below which is emptied prior to cleaning. Both the lower housing unit 20 and the cooking pan represented by the lower cooking element 32 and its handle 56 can be completely immersed in water for through cleaning. The upper unit, although not immersible, is readily cleaned by wiping.

Although cooking area 38 in the presently preferred embodiment is circular in shape, and the upper and lower cooking surfaces 44 and 180 flat, it will be appreciated that they may have any other shape or configuration consistent with the food to be cooked by the appliance. Thus where the appliance is intended to be used for grilling or heating other foods such as sandwiches or the like, it may be advantageous to have rib 108 and its receiving channel 42 arranged in more of a rectangular or square configuration. In other modifications of the invention, heating element 120 may be staked to the upper side of the upper cooking element 62, rather than located within depending rib 108. In such modifications, either the upper or the lower cooking element may be provided with the integral rib which encircles the cooking area; and the outer surface of the rib will be shaped to have wide area surface contact with the other cooking element which may or may not be suitably channeled to receive said rib.

Thus from the aforedescribed embodiments of the invention it will be appreciated that all of the recited objects, advantages and/or features of the invention have been demonstrated as obtainable in a convenient and highly practical manner.

Having described the invention, I claim:

1. An electric appliance for simultaneously cooking hamburgers and the like on both sides while removing the separating grease as the hamburger cooks, said appliance comprising a concave base and a separable cover thereover, both said cover and concave base being of heat insulating material, a pan of heat conductive metal having a heat insulated handle, said pan embodying a concave cooking portion having a surrounding wall portion and a continuous channel outwardly of and about said wall portion, said pan being removably seated within the cover-facing side of the base with its concave cooking portion spaced off the bottom wall of the base and its heat insulated handle extending outwardly of the base, said concave cooking portion having apertures in its bottom wall inwardly of said surrounding wall portion through which grease drains during cooking for collection therebelow in the concave base, the cover supporting a cooking element of heat conductive metal on its underside, said cooking element having a surrounding depending rib which received within said channel in close proximity therewith when the cover is closed against the base, the rib containing an electrical heating element in effective heat transfer relation therewith, and releasable locking means on the cover and base for firmly holding of the cover in engaged heat conductive relation with portions said rib against the base of the channel when the cover is closed against the base, the single heating element thereby simultaneously heating the pan and the cooking element of the cover.

2. An electric cooking appliance comprising a receptacle-like base of heat insulative material having an elongated recessed handle and a lower cooking element of heat conductive metal embodying a central cooking area and a surrounding wall portion, said lower cooking element being removably seated in said base with its central cooking area spaced off the bottom wall of the base, said central cooking area of the lower cooking element having apertures through which fluid from food cooking therein can drain into the receptacle base, the lower cooking element further having an elongated heat insulated handle provided with a locating portion received in said recessed handle, and a cover of heat insulative material removably hinged to the receptacle-like base on the side thereof opposite its handle, an upper cooking element of heat conductive metal fixed to said cover having a depending rib to engage the lower cooking element outwardly of said wall portion in close proximity therewith, said rib containing an electrically energizable heating element connecting to externally accessible terminal posts in the cover, said cover having a handle which overlies the handle of the lower cooking element when located by the recessed handle of the base, and bail means for locking the handles together, the rib being thereby urged into an effective heat transfer relation with the lower cooking element such that both cooking elements are simultaneously heated by the single heating element when energized.

3. The electric cooking appliance of claim 2 wherein the cover is hingedly connected to the base by means of a provided projection having an arcuate undersurface slidably received on a similar arcuately shaped upper surface of a projecting portion of the base.

4. The electric cooking appliance of claim 3 further having bail means pivotally connected to one of said projection and projecting portion and releasably catchable with the other.

5. The electric cooking appliance of claim 2 having a thermostat within the cover and supported by the upper cooking element in heat sensing relation therewith, said thermostat being in circuit with the heating element for control thereof.

6. The electric cooking appliance of claim 2 wherein the heating element is staked within a provided channel in the depending rib of the upper cooking element.

7. An electric cooking appliance comprising upper and lower cooking elements of heat conductive metal having cooking areas between which food is located for cooking, the upper one of said cooking elements having an integral rib disposed about its cooking area and which is adapted to engage a surrounding peripheral portion of the lower cooking element about its cooking area, said peripheral portion being shaped to have surface area contact with the base of the rib when urged thereagainst, the lower cooking element having an upstanding wall about its cooking area and inwardly of its surrounding peripheral portion, the cooking area of the lower cooking element containing apertures through which fluid drains from the food as it cooks, a base receptacle of heat insulating material in which the lower cooking element is removably seated with its cooking area spaced off the bottom wall of the base receptacle, said base receptacle serving to contain fluid draining through the apertures in the lower cooking element, a cover of heat insulative material hinged to the base receptacle, the upper cooking element being fixedly mounted in said cover, and each said cover and base receptacle having aligned handles at least one of which is recessed, the lower cooking element having a handle of heat insulated material between said aligned handles of the hingedly connected cover and base receptacle, the handle of the lower cooking element having a locating portion received by the recessed handle, the upper cooking element having an electrically energizable heating element in heat transfer relationship with said rib, and means for releasably drawing the cover handle to the handle of the base receptacle so as to lock the assembly and establish an effective heat transfer relation between the rib and the surrounding peripheral portion of the other cooking element whereby food placed between the cooking elements will be simultaneously heated from all sides upon energizing of the single heating element.

8. An electric cooking appliance as claimed in claim 7 wherein the rib is integral with the upper cooking element and the heating element is contained within the rib.

9. An electric cooking appliance as claimed in claim 7 wherein the upper cooking element has a channel in its upper side and the heating element is fixed within said channel.

10. The electric cooking appliance of claim 7 wherein said lower cooking element has a continuous channel in said surrounding peripheral portion about its said central cooking area, the rib of the upper cooking element being received within said channel when the cover is closed against the base.

11. An electric cooking appliance comprising a receptacle-like base of heat insulative material, a lower cooking element of heat conductive metal removably seated in the open top of said base, said lower cooking element having a central cooking area and peripherally-disposed channel on its upper side, and an elongated heat insulated handle projecting from the periphery thereof, said lower cooking element having spaced apertures inwardly of said channel, and the receptacle-like base having peripherally disposed ledge means on which the peripheral portion of said lower cooking element rests to define a fluid retaining space between the central cooking area of said lower cooking element and the bottom of the base, a cover of heat insulative material overlying the open top of the base and lower cooking element when seated therein, said cover being removably hinged to the base, and an upper cooking element of heat conductive material fixed within said cover, said upper cooking element having a depending rib which is shaped to be received within said channel of the lower cooking element in close proximity with the inner and outer walls thereof, an electrical heating element within said depending rib which is electrically connected to externally accessible terminal posts in the cover, said cover and base having elongated sides to receive portions of the lower cooking element handle, and locking means which releasably engage about said handles to secure the depending rib within the channel such that both cooking elements are simultaneously heated by the single heating element when connected through said terminal posts to an electrical energy source.

12. The electric cooking appliance of claim 11 further containing a thermostat within the cover and mounted in heat sensing relation to the upper side of the upper cooking element, the electrical heating element being connected to said thermostat so as to be under the control thereof.

13. An electric cooking appliance useful for simultaneously cooking both sides of food such as a hamburger while also draining the collecting fluid as the food cooks, the appliance comprising upper and lower concentric cooking elements of heat conductive metal each including a central cooking area between which the food is located and a surrounding outer marginal portion, the lower one of said cooking elements having an elongated heat insulated handle and spaced apertures about the periphery of its cooking area inwardly of its said surrounding outer marginal portion, a base including an open top receptacle of heat insulative material having peripherally located ledge means on which the lower cooking element is removably supported within said receptacle off its bottom wall to contain fluid draining through said apertures, a cover of heat insulating material positionable over the top of said receptacle and within which the upper cooking element is affixed, the surrounding outer marginal portion of said upper cooking element embodying a continuous rib of heat conductive metal about the cooking area having an electrical heating element in intimate heat transfer relation therewith, a thermostatic switch mounted within said cover on the upper side of said upper cooking element to sense the temperature thereof, the heating element being connected to said thermostatic switch and to externally accessible terminal posts in said cover such that when said terminal posts are connected to an electrical energy source the upper cooking element will be heated to a temperature determined by said thermostatic switch, the base and cover each having an elongated handle portion of heat insulated material, the facing sides of which are recessed to receive portions of the lower cooking element handle when aligned therebetween, the base and cover further having separable interfitting portions diametrically opposite their respective handle portions which accommodate hinging of the cover relative to the base, the surrounding outer marginal portion of the lower one of said cooking elements having a channel to receive said continuous rib of heat conductive metal, in close proximity with the walls thereof and bail means which removably secure said handles of the base and cover such that the rib is urged into intimate and efficient heat transfer relationship with the base of the channel of the outer cooking element, whereby the cooking areas of the two cooking elements and the rib are simultaneously heated to a temperature controlled by the thermostatic switch means.

\* \* \* \* \*

UNITED STATES PATENT OFFICE
CERTIFICATE OF CORRECTION

Patent No. 3,963,898     Dated June 15, 1976

Inventor(s) Clayton K. Tuckwell

It is certified that error appears in the above-identified patent and that said Letters Patent are hereby corrected as shown below:

Column 4, line 28,   "is" changed to --as--;

Column 7, line 1,    before "received" inserted --is--;

lines 5-7,   Cancelled "of the cover in engaged heat conductive relation with portions";

Column 8, line 65,   "elongated" changed to --elongate handles of heat insulated material recessed on their facing--;

Column 10, line 26,  "outer" changed to --other--.

Signed and Sealed this

Tenth Day of May 1977

[SEAL]

Attest:

RUTH C. MASON
*Attesting Officer*

C. MARSHALL DANN
*Commissioner of Patents and Trademarks*